(12) United States Patent
Cheymol et al.

(10) Patent No.: US 8,743,129 B2
(45) Date of Patent: Jun. 3, 2014

(54) DISPLAY SYSTEM FOR AVIONIC AND NON-AVIONIC APPLICATIONS

(75) Inventors: Lionel Cheymol, Toulouse (FR); Vincent Foucart, Toulouse (FR); Simon Innocent, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 1125 days.

(21) Appl. No.: 12/666,870

(22) PCT Filed: Jul. 2, 2008

(86) PCT No.: PCT/EP2008/058493
§ 371 (c)(1),
(2), (4) Date: Apr. 20, 2010

(87) PCT Pub. No.: WO2009/004023
PCT Pub. Date: Jan. 8, 2009

(65) Prior Publication Data
US 2010/0253692 A1    Oct. 7, 2010

(30) Foreign Application Priority Data

Jul. 5, 2007   (FR) ...................................... 07 56283

(51) Int. Cl.
*G06T 1/00*   (2006.01)
(52) U.S. Cl.
USPC ........... 345/522; 345/530; 345/541; 345/542; 345/543; 345/544; 345/545; 345/547
(58) Field of Classification Search
USPC .......................... 345/522, 530, 541–545, 547
See application file for complete search history.

(56) References Cited

U.S. PATENT DOCUMENTS

| | | | |
|---|---|---|---|
| 5,931,874 A * | 8/1999 | Ebert et al. ........................ | 701/1 |
| 6,038,498 A | 3/2000 | Briffe et al. | |
| 6,351,270 B1 * | 2/2002 | Nishikawa et al. ........... | 715/717 |
| 2003/0038844 A1 * | 2/2003 | Royalty ........................ | 345/781 |
| 2006/0184253 A1 | 8/2006 | Andrews et al. | |
| 2007/0038339 A1 * | 2/2007 | Shirley et al. ................... | 701/14 |
| 2007/0038939 A1 * | 2/2007 | Challen et al. ................ | 715/734 |
| 2008/0215192 A1 * | 9/2008 | Hardman et al. ................ | 701/3 |

* cited by examiner

*Primary Examiner* — Ke Xiao
*Assistant Examiner* — Kim-Thanh T Tran
(74) *Attorney, Agent, or Firm* — Oblon, Spivak, McClelland, Maier & Neustadt, L.L.P.

(57) ABSTRACT

The present invention relates to a display device for a glass cockpit of an aircraft, intended to provide video streams to a plurality of viewing screens of said glass cockpit, said aircraft being partitioned into a secured area, a so-called avionic world (AW), and a non-secured area, a so-called open world (OW), said system comprising at least one first port intended to receive first data to be displayed from a system (210, 310, 410) belonging to the avionic area and at least one second port intended to receive second data to be displayed from a system (220, 320, 420) belonging to the open world, the display device comprising:
predetermined hardware resources allocated to the processing of the second data;
a processor (241, 341, 441), belonging to the avionic area, adapted to controlling the hardware resources used by said processing and interrupting this processing if said hardware resources used exceed said allocated resources.

16 Claims, 4 Drawing Sheets

DISPLAY SYSTEM FOR AVIONIC AND NON-AVIONIC APPLICATIONS

TECHNICAL FIELD

The present invention generally relates to display systems for a multiple screen instrument panel called Glass Cockpit in an aircraft cockpit, also called CDS (Cockpit Display System).

STATE OF THE PRIOR ART

Certain aircraft cockpits are henceforth equipped with a glass cockpit, in which the traditional needle instruments have been replaced with screens, notably LCD screens. These screens allow display of indispensable information for conducting flight, such as that relating to flight control, navigation, communications. This information is generated and provided by on-board systems, so-called avionic systems, complying with certain integrity and availability constraints.

In addition to avionic information, the pilots may consult online a certain number of so-called <<non-avionic>> pieces of information, formerly available on a paper medium, such as navigation maps, calculation abacuses, handbooks, etc. These pieces of information are not essential for flight control and are not subject to the aforementioned constraints. They are generally provided by applications which are not specifically developed for avionic needs, for example <<general public>> type applications developed under Windows™ which often require hardware resources that the avionic systems cannot provide or would only provide at a high cost.

In order to reconcile distinct requirements of avionic and non-avionic applications, the partitioning of the aircraft into an avionic area, also called <<secured area>>, and a non-avionic area, also called <<open world>> is known. Each of these two areas comprises computer equipment, such as terminals, servers, etc., connected to an on-board network. This network has the particularity of being partitioned into two subnetworks corresponding to the secured area and to the non-secured area, respectively. The links within a same area may be of the bidirectional type while the inter-area links are necessarily of the unidirectional type, directed from the secured area to the non-secured area.

It is essential to maintain strict segregation between secured and non-secured areas, this for two reasons. First of all, any accidental or malevolent intrusion into the secured area, should be prevented, notably any computer hacking which might originate from the open world. Next, it is important that the applications hosted in the open world do not perturb those hosted in the avionic area, i.e. challenge the deterministic behavior of the latter.

Figure 1:
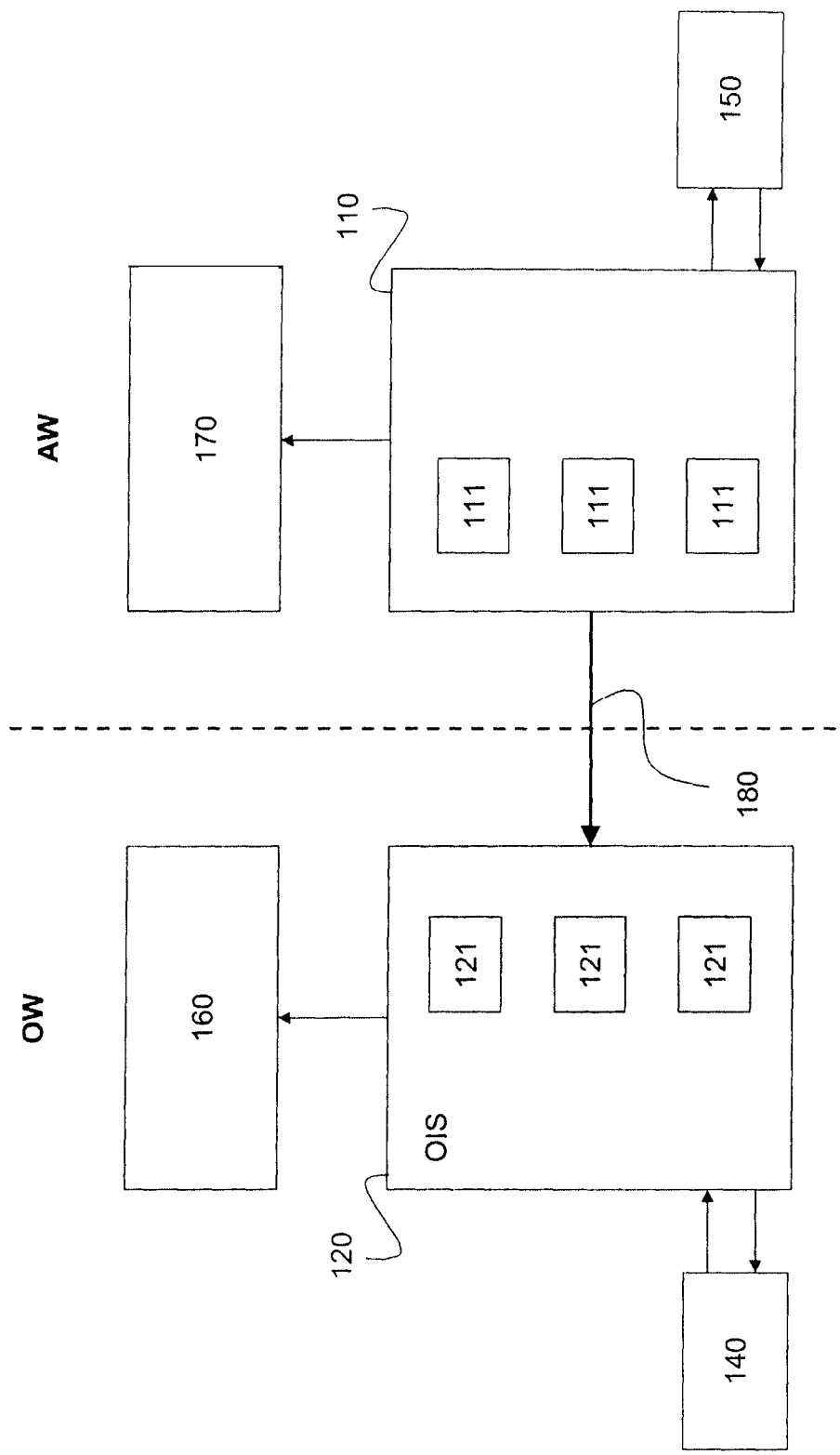

FIG. 1 illustrates a known architecture of an on-board computer system ensuring segregation between an avionic world (AW) and an open world (OW).

The information system 100 is divided into two systems, an avionic system 110 and a non-avionic system, a so-called OIS (On-board Information System), 120, each having its own execution platforms 111 and 121, its own display means 170 and 160 and its own control peripherals 130 and 140. The execution platforms 111 and 121 consist of hardware means (processors, servers, etc.) allowing execution of avionic and non-avionic applications. By control peripheral, are meant means such as a keyboard, mouse, joystick, either dedicated or not, allowing the operator to interact with the information system to which he/she is connected.

The execution platforms are connected to the on-board network, the links between platforms of the AW area and of the OW area necessarily being of the unidirectional type as symbolized in 180.

The architecture illustrated in FIG. 1 is however not entirely satisfactory. Indeed, it requires two types of distinct screens on the instrument panel of the cockpit, which is expressed by distinct developments, relatively complex management of spare parts and maintenance. Further, this architecture lacks flexibility. Indeed, as the partition between screens of the avionic area and screens of the open world is set, the pilots cannot change any display configuration, for example display a piece of information of a given type on the screen of his/her choice, or further modify the number or the distribution of the screens of each type within the cockpit. For example, the pilot may desire to display avionic information on the central screens, thereby facilitating collaborative work with the copilot, or even group on a same screen or even contiguous screens avionic information which he/she wishes to be able to easily compare.

With the display configuration flexibility, it is also possible to, if need be, benefit from a larger display surface area for avionic information or a contrario to benefit from better display quality screens (for example with a larger dynamic range for adjusting the luminosity) for non-avionic information.

Finally, the duplication of input peripherals for avionic and non-avionic applications is a source of additional on-board weight as well as overcosts in management and maintenance.

A first object of the present invention is therefore to provide large flexibility of the display configuration and mutualization of the screens of the cockpit, without challenging the segregation guarantee between the avionic area and the open world.

A second object of the present invention is to mutualize the control peripherals allowing an operator to interact with avionic and non-avionic applications.

DISCUSSION OF THE INVENTION

The present invention is defined by a display system for a glass cockpit of an aircraft, intended to provide video streams to a plurality of viewing screens of said instrument panel, said aircraft being partitioned into a secured, so-called avionic area, and a non-secured, so-called open world area, said system comprising at least one first port intended to receive first data to be displayed of a system, belonging to the avionic area, a so-called avionic system, and at least one second port intended to receive second data to be displayed from a system belonging to the open world, a so-called non-avionic system. The display system comprises:

predetermined hardware resources allocated to the processing of the second data;

a processor, belonging to the avionic area, adapted for monitoring the hardware resources used by said processing and interrupting the latter if said used hardware resources exceed said allocated resources.

The hardware resources for example are memory areas or memory sizes, execution times, frame frequencies or frame durations, or further display areas on at least one of said viewing screens.

Advantageously, the display may comprise a video buffer intended to store at least one video stream originating from the non-avionic system, said buffer being controlled by said processor.

It may also comprise a graphic card adapted for receiving graphic commands from the processor in order to generate at least one video stream relating to symbology, said graphic commands being generated by the processor from data to be displayed from the avionic system.

It may finally comprise a video mixer adapted for combining at least said video stream relating to symbology and the video stream originating from the non-avionic system in order to generate at least one video stream sent to one of said viewing screens.

The invention may also relate to an information system loaded on-board an aircraft, partitioned into a secured area, a so-called avionic world, and a non-secured area, a so-called open world, said information system comprising a display system as defined above, an avionic system in the avionic area and a non-avionic system in the open world. The on-board information system further comprises a control peripheral connected to the avionic system by means of a bidirectional bus and to the non-avionic system by a unidirectional bus, directed from the control peripheral towards the non-avionic system.

Advantageously, the on-board information system further comprises a video concentrator adapted for receiving a video stream from a second avionic system as well as a video stream from the non-avionic system in order to generate at least one video stream sent to said video buffer.

According to one alternative, the video stream of the non-avionic system, is transmitted to a conversion gateway via an Ethernet link, said gateway being connected to said display system through an Arinc 429 link and being adapted so as to convert Ethernet frames into words with the Arinc 429 format.

SHORT DESCRIPTION OF THE DRAWINGS

Figure 2:
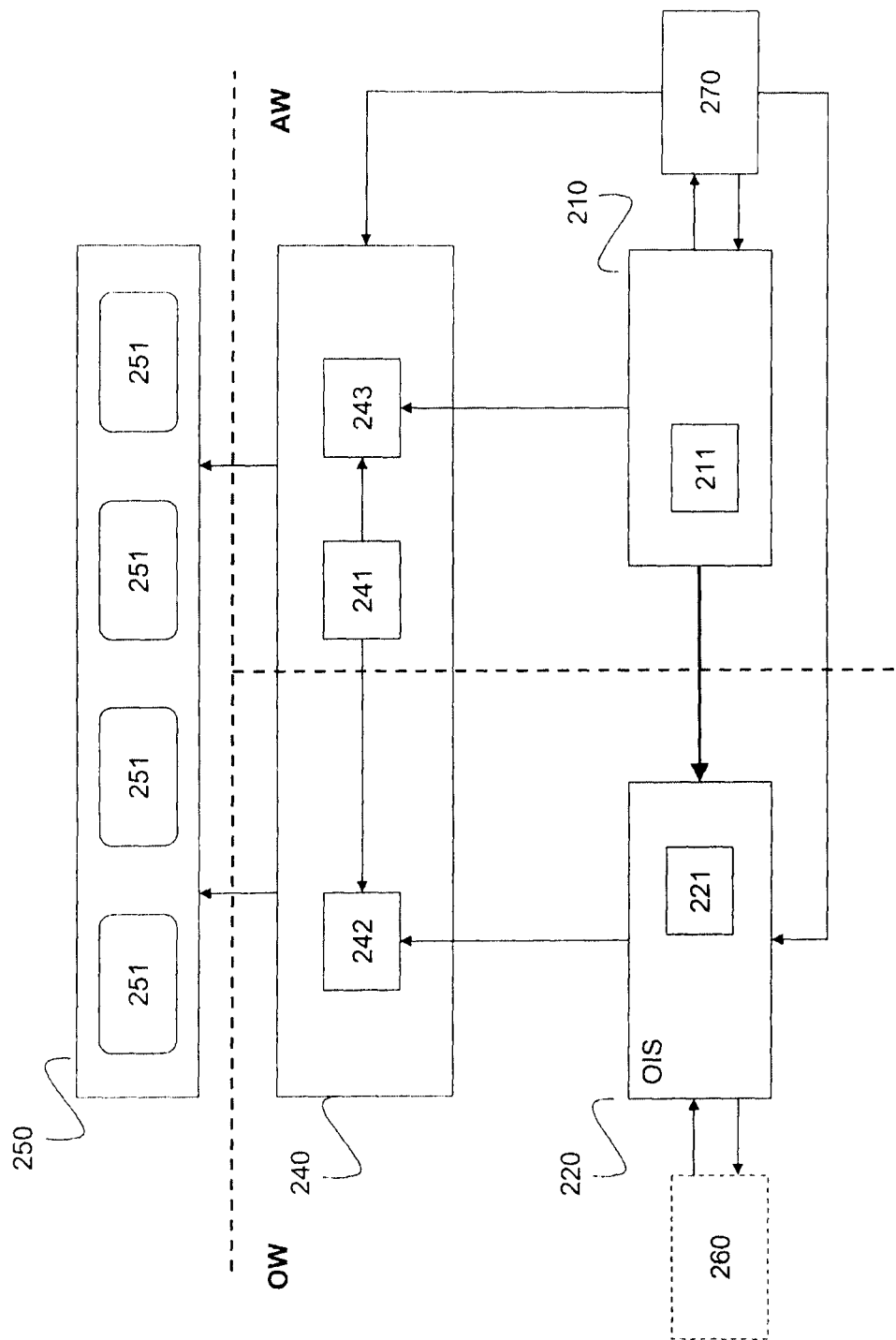
Figure 3:
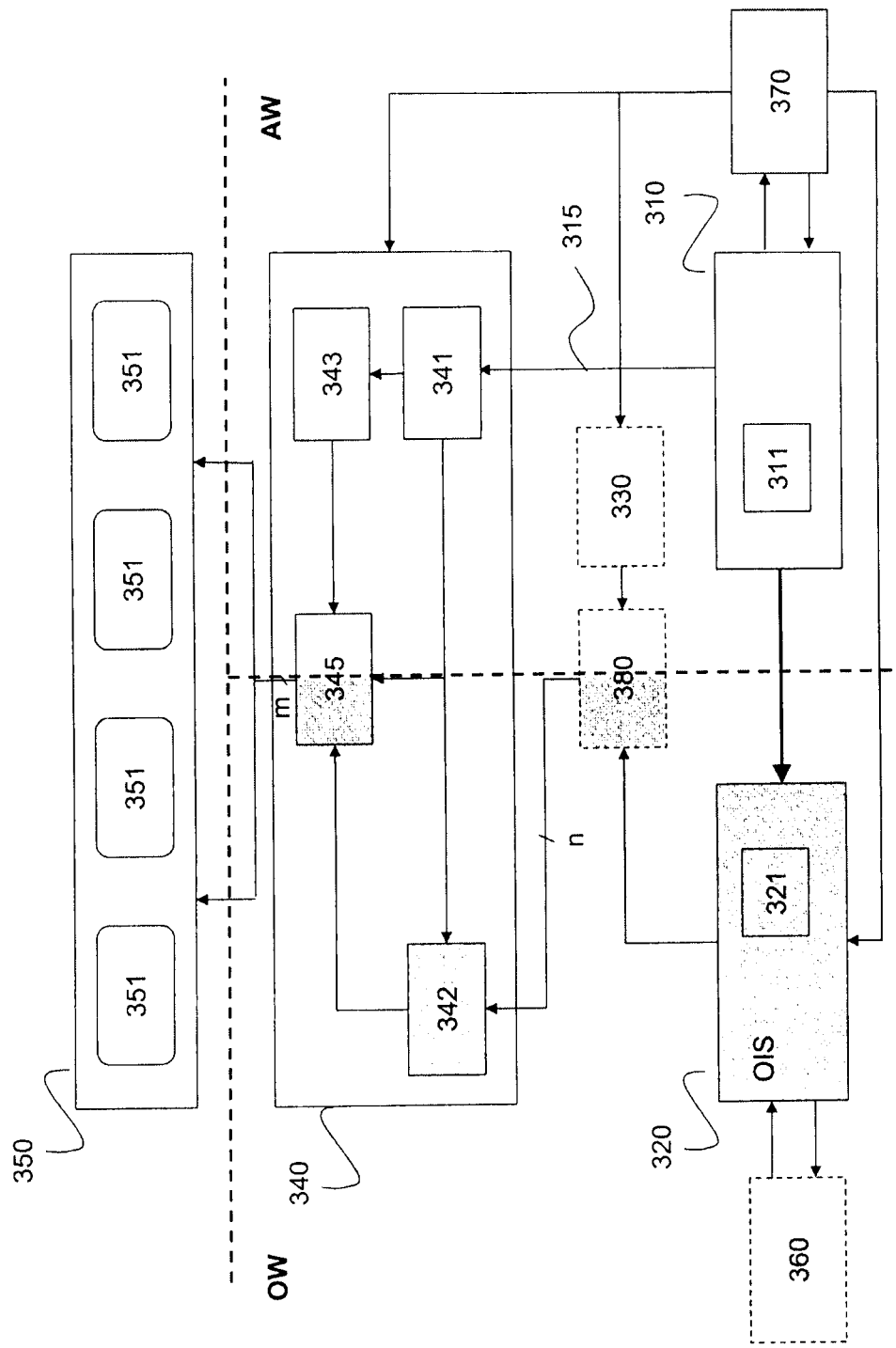
Figure 4:
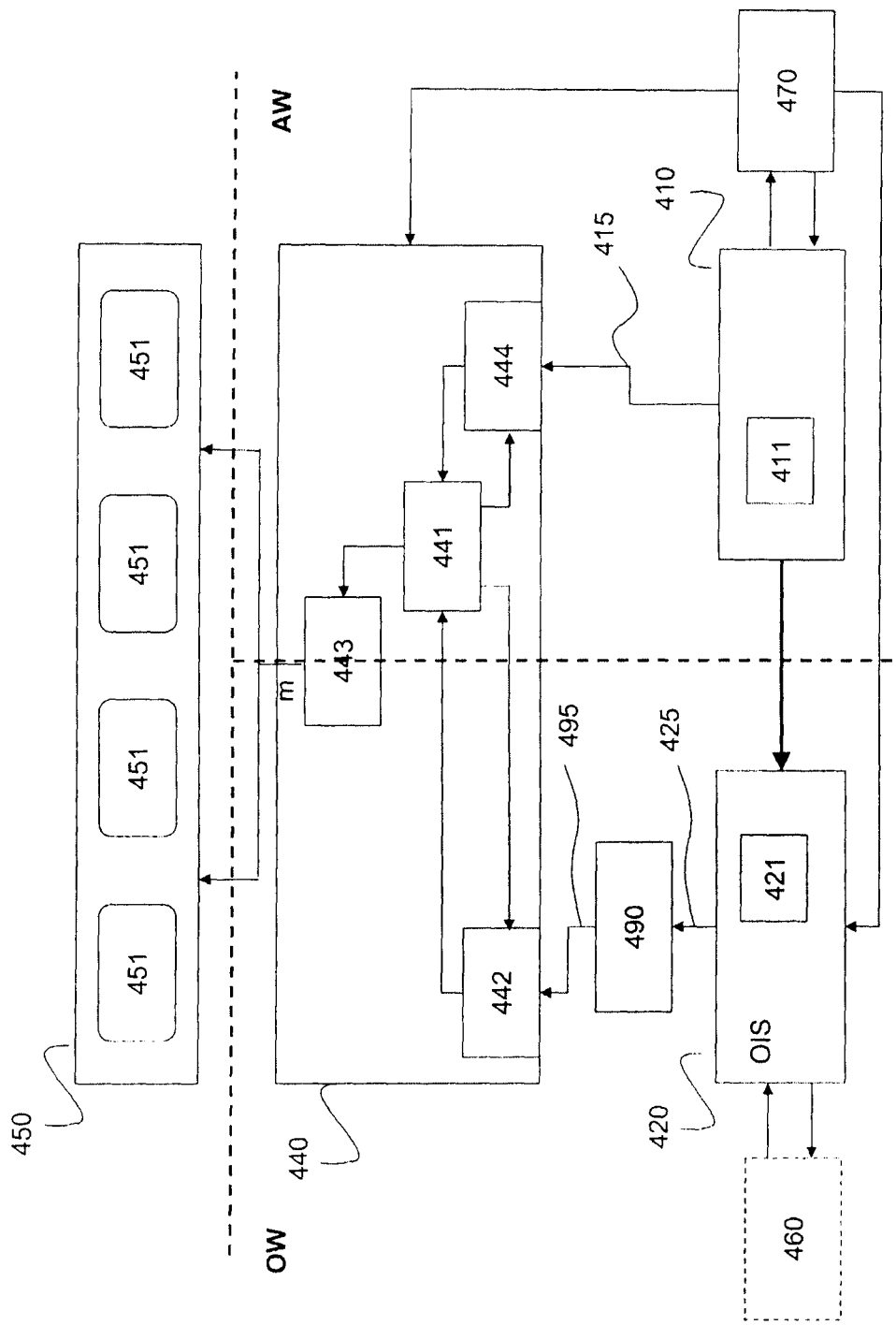

Other characteristics and advantages of the invention will become apparent upon reading a preferential embodiment of the invention made with reference to the appended figures wherein:

FIG. 1 schematically illustrates a known exemplary architecture of an on-board information system ensuring segregation between the avionic area (AW) and the open world (OW);

FIG. 2 schematically illustrates an architecture of an on-board information system using a display system for a glass cockpit, according to the general principle of the invention;

FIG. 3 schematically illustrates an architecture of an on-board information system using a display system for a glass cockpit, according to a first embodiment of the invention;

FIG. 4 schematically illustrates an architecture of an on-board information system using a display system for a glass cockpit, according to a second embodiment of the invention.

DETAILED DISCUSSION OF PARTICULAR EMBODIMENTS

The idea at the basis of the invention is to allocate determined hardware resources to the processing of data to be displayed originating from systems belonging to the open world and to control the use of these resources by a processor belonging to the avionic area.

More specifically, FIG. 2 illustrates the architecture of the on-board information system according to the general principle of the invention. Again a distinction is made between the avionic area (AW) and the non-secured area (OW). The on-board information system is divided into a avionic system 210, and an OIS system, 220, respectively comprising execution platforms 211 and 221 connected to an on-board network. The links between the avionic system and the OIS system are unidirectional and directed from the avionic area towards the open world. Unlike the state of the art, the viewing screens 251 of the instrument panel 250 are mutualized between the avionic area and the open world. The management of the mutualized screens is carried out by a common display system (CDS) 240 comprising processing means 243, 242 using hardware resources allocated to processing avionic data and non-avionic data, respectively. The display system 240 further comprises a processor 241 responsible i.a. for monitoring the hardware resources used for treating non-avionic data. If the hardware resources used exceed those which are allocated to it, the processor interrupts this processing.

It is thus guaranteed that, at no moment, the processing of non-avionic data uses more resources than those provided, and does not thereby affect the processing of avionic data. The integrity and the availability of the resources of the avionic area are preserved.

After processing by the means 242, 243, the avionic and non-avionic data are demultiplexed and then transmitted as video streams to the display screens 251. The demultiplexing configuration is defined by the operator by means of the control peripheral 270.

Moreover, the control peripheral 270 allows the operator to configure and control the execution platforms 211 and 221. It is connected to the OIS system 220 by means of a unidirectional bus and may be connected to the avionic system 210 by means of a bidirectional bus. A second optional control peripheral 260 may be connected to the OIS system by means of a bidirectional bus.

FIG. 3 schematically illustrates an architecture of an on-board information system using a display system according to a first embodiment of the invention.

The elements referenced as 310, 311, 320, 321, 350, 351, 360, 370 are respectively identical with those referenced as 210, 211, 220, 221, 250, 251, 260, 270 of FIG. 2 and will therefore not be described again.

The display system comprises a processor 341, a video buffer 342, a graphic card 343 and a video mixer 345. The video buffer 342 temporarily stores at least one video stream, and generally a plurality n of video streams originating from the OIS system or from the video concentrator 380, as described later on.

The processor 341 receives from the avionic system 310 via the bus 315, for example an Arinc 429 bus or an AFDX (Avionics Full DupleX) network link, data to be displayed (avionic parameters) and generates, by means of graphic library, the commands for driving the corresponding symbology. These commands are executed by the graphic card 343. The video streams relating to symbology are then mixed with video streams originating from the OIS system, stored in the video buffer 342 in order to generate m mixed video streams, sent to the m viewing screens also called VDUs (Visual Display Units) 351. The mixed streams will preferably be in the DVI (Digital Visual Interface) format. Mixing is carried out by combining <<alpha compositing >> type video streams, the selection of the alpha coefficients for different areas, allowing determination in each of these areas, of the image in the foreground and more generally the superposition level of the images represented by each of these streams.

Optionally, a second avionic system 330 may directly generate a video stream representing symbology, without preprocessing by the processor 341. In this case, the video streams originating from the second avionic system 330 and from the OIS system, respectively, are processed by the video concentrator in order to generate a plurality n of streams, for example in the Arinc format 818 sent to the display system 340.

In addition to its graphic command functions, the processor monitors the use of the allocated hardware resources for processing non-avionic data. These resources may generally be memory areas or sizes, time intervals or execution durations, frame frequencies, resolution ranges, discrete sets or continuous ranges of parameters. Thus, the processor may check that the parameters used for the video signals are actually those which are authorized, that the memory areas are well observed, that the frame return intervals are not used for transmitting auxiliary data, that the coefficients used in the video mixing are legal, i.e. actually correspond to the composition of images programmed by the operator for the different screens.

If the processor detects violation of these constraints in the use of the hardware resources, in other words if the actually used resources for processing non-avionic data exceed those which are allocated to it, the processor interrupts the processing. For example the processor may forbid reading of the video buffer 342, writing into a memory area, may force an image composition coefficient to zero.

It will be understood that in this way the integrity and the availability of the resources for processing avionic data are ensured.

FIG. 4 schematically illustrates an architecture of an on-board information system using a display system according to a second embodiment of the invention.

The elements referenced as 410, 411, 420, 421, 450, 451, 460, 470 are respectively identical with those referenced as 210, 211, 220, 221, 250, 251, 260, 270 of FIG. 2 and will therefore not be described again.

Unlike the first embodiment, the segregation between avionic and non-avionic data is ensured upstream from the generation of the video stream. More specifically, the avionic system 410 transmits avionic data to be displayed, as messages, to a first input port 444 and the OIS system transmits the non-avionic data to be displayed, as messages, to a second input port 442 of the display system 440. Preferably, avionic data are transmitted via a link 415 of an AFDX network, with the conventional determinism guarantees associated with this network. The OIS system data may be transmitted via a conventional Ethernet link 425 to a conversion gateway 490. The conversion gateway is connected to the second input port of the display system by means of a link 495 of the Arinc 429 type. The conversion gateway is adapted in order to convert Ethernet frames into Arinc 429 words. Advantageously the messages transmitted by the avionic system 410 and the conversion gateway 490 comply with the Arinc protocol 661.

The processor 441 controls the input ports 442 and 444, and generates with a graphic library, the graphic commands associated with avionic symbology on the one hand, and graphic commands associated with non-avionic data on the other hand. These commands are transmitted to the graphic card 443 in order to generate the video streams, preferably in the DVI format, sent to m viewing screens 451. The demultiplexing of the m different video streams towards the m screens is configured by the operator by means of the peripheral 470. The latter is also connected to the avionic system through a bidirectional bus and to the OIS system through a unidirectional bus, just as for the first embodiment.

The processor 441 monitors the hardware resources used for processing the non-avionic data, for example the compliance of the messages with the Arinc protocol 661, notably the frequency and the length of the frames, the validity of the headers or further, the memory areas. Advantageously, the memory is partitioned into independent blocks either used for avionic data or for non-avionic data. If a non-avionic application crosses the limits of the block or of the blocks which are reserved for it, or more generally if it crosses the limits of the resources which are allocated to it, the processor prevents access to the port 442.

The invention claimed is:

1. A display system for a glass cockpit of an aircraft cockpit for providing video to a plurality of viewing screens of an instrument panel of said glass cockpit, said display system being partitioned into a secured avionic area and a non-secured open area, said display system comprising:
    at least one first port configured to receive first data to be displayed from a secured avionic system of the secured avionic area;
    at least one second port configured to receive second data to be displayed from a non-secured on-board information system of the non-secured open area;
    predetermined hardware resources allocated to processing of the second data; and
    a first processor in the secured avionic area of the display system configured to monitor the hardware resources used by the processing of the second data and to interrupt the processing of the second data when said hardware resources used exceed corresponding allocated amounts,
    wherein the first data is essential flight control data and the second data is non-essential for flight control.

2. The display system according to claim 1, wherein said hardware resources are memory areas or memory sizes.

3. The display system according to claim 1, wherein said hardware resources are execution times, frame frequencies, or frame durations.

4. The display system according to claim 1, wherein said hardware resources are display areas on at least one of said viewing screens.

5. The display system according to claim 1, further comprising a video buffer configured to store at least one video stream originating from said non-secured on-board information system of the non-secured open area, said video buffer being controlled by said first processor.

6. The display system according to claim 1, further comprising a graphic card configured to receive graphic commands from said first processor to generate at least one video stream relating to symbology, said graphic commands being generated by said first processor from the first data to be displayed from said secured avionic system of the secured avionic area.

7. The display system according to claim 5, further comprising a video mixer configured to combine at least said video stream relating to the symbology and the video stream originating from said non-secured on-board information system of the non-secured open area to generate at least one video stream to be sent to one of said viewing screens.

8. An information system loaded on-board an aircraft, partitioned into a secured avionic area and a non-secured open area, said information system comprising:
    a display system for a glass cockpit of an aircraft cockpit for providing video to a plurality of viewing screens of an instrument panel of said glass cockpit, said display system being partitioned into the secured avionic area and the non-secured open area, said display system including:
        at least one first port configured to receive first data to be displayed from a secured avionic system of the secured avionic area,
        at least one second port configured to receive second data to be displayed from a non-secured on-board information system of the non-secured open area, predetermined hardware resources allocated to processing of the second data, and a first processor in the secured avionic area of the display system configured to monitor the hardware resources used by the processing of the second data and to interrupt the processing of the second data when said hardware resources used exceed corresponding allocated amounts, wherein the first data is essential flight control data and the second data is non-essential for flight control;

said secured avionic system of the secured avionic area;

said non-secured on-board information system of the non-secured open area; and a control peripheral connected to said secured avionic system via a bidirectional bus and to said non-secured on-board information system via a unidirectional bus in a direction from the control peripheral towards said non-secured on-board information system of the non-secured open area.

9. The on-board information system according to claim 8, further comprising a video concentrator configured to receive a video stream from a second secured avionic system of the secured avionic area and a video stream from said non-secured on-board information system of the non-secured open area to generate at least one video stream to be sent to said video buffer.

10. The on-board information system according to claim 8, wherein a video stream of said non-secured on-board information system of the non-secured open area is transmitted to a conversion gateway via an Ethernet link, said conversion gateway being connected to said display system through an Arinc 429 link and being configured to convert Ethernet frames into words with Arinc 429 format.

11. The display system according to claim 1, further comprising a third port electrically coupled to peripheral control circuitry configured to define a demultiplexing configuration for outputting data for display on one or more of said viewing screens based on said received first and second data.

12. The display system according to claim 1, wherein said secured avionic system of the secured avionic area and said non-secured on-board information system of the non-secured open area are connected via a unidirectional link, the direction of the unidirectional link being from said secured avionic system of the secured avionic area to said non-secured on-board information system of the non-secured open area.

13. The display system according to claim 1, wherein said secured avionic system of the secured avionic area includes a first execution platform, and said non-secured on-board information system of the non-secured open area includes a second execution platform different from the first execution platform.

14. The display system according to claim 1, wherein all links between components of the secured avionic area and the non-secured open area are unidirectional from the secured avionic area to the non-secured open area.

15. The display system according to claim 1, further comprising a second processor in the non-secured open area, said second processor being connected to said non-secured on-board information system of the non-secured open area, and said second processor being connected to said first processor via a unidirectional connection from said first processor to said second processor.

16. The display system according to claim 1, wherein the first data is displayed on a first viewing screen of the plurality, and the second data is displayed on a second viewing screen of the plurality.

* * * * *